Jan. 16, 1934.  C. H. FRAZER  1,943,472
BUS
Filed Feb. 20, 1930
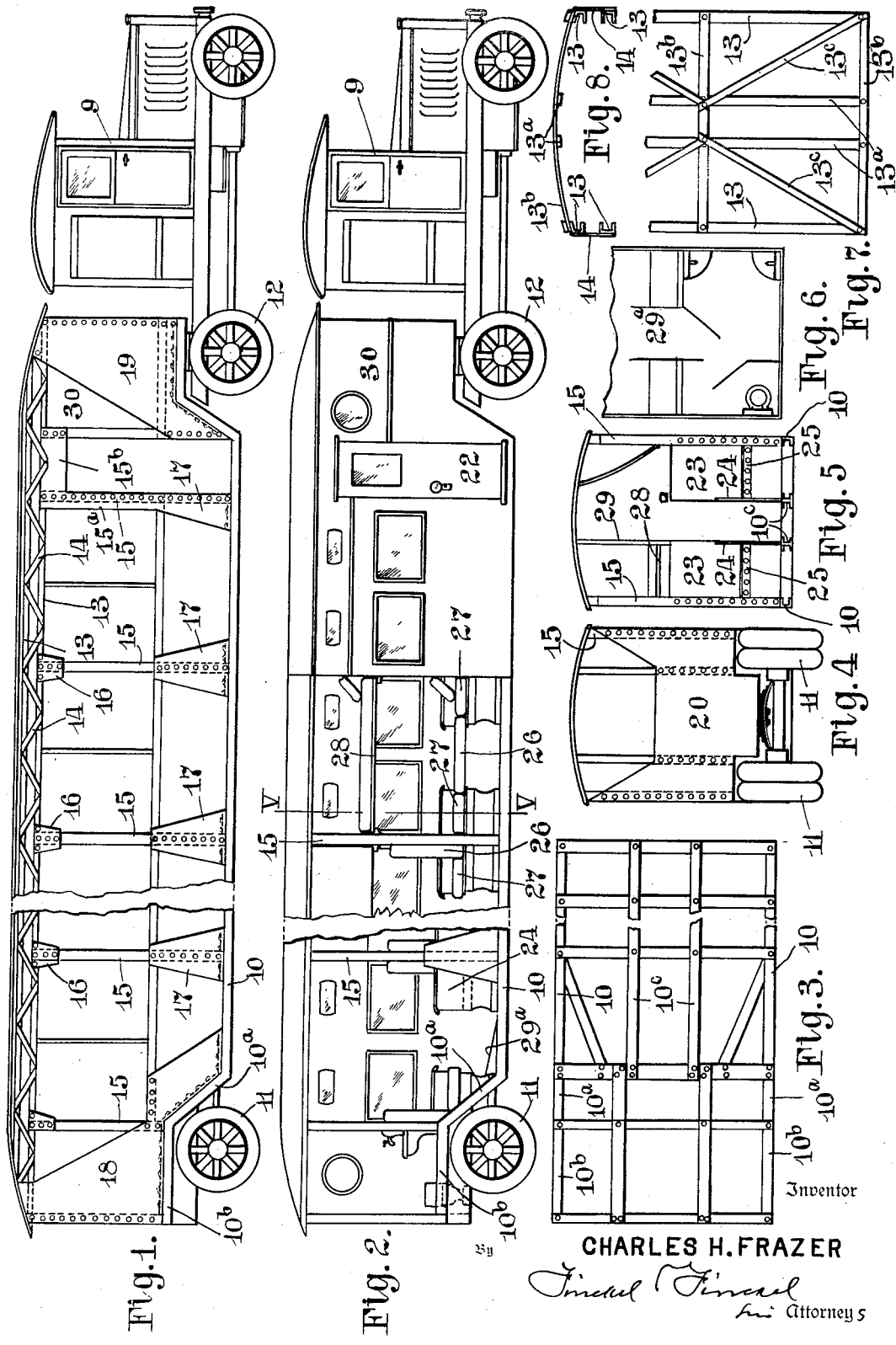
Inventor
CHARLES H. FRAZER
By
Attorneys Patented Jan. 16, 1934

1,943,472

UNITED STATES PATENT OFFICE 1,943,472

BUS

Charles H. Frazer, Columbus, Ohio

Application February 20, 1930. Serial No. 429,849

2 Claims. (Cl. 296—28)

This invention relates generally to busses such as now commonly used for the transportation of passengers. Traveling in such busses is somewhat more dangerous than traveling on railroads. For example collisions and overturning in ditches and on side slopes are more likely and more frequent than with railroad cars which are retained in proper position by rails.

The object of the invention is to provide a bus of strong but light construction. Another object is to resist the tendency to turn over by putting much of the room and weight nearer the ground. Other objects are indicated in the following description taken in connection with the accompanying drawing in which one example of the invention is shown. In the example the bus is shown as of the trailer type, the tractor being shown as connected at the forward end thereof with the wheels of the tractor supporting the forward end of the trailer.

In said drawing—

Figure 1 is a skeletal side view of a bus according to the invention, broken out vertically to illustrate some of the framing elements thereof.

Fig. 2 is a broken view illustrating the exterior appearance at the forward end and some of the interior details thereof at the rear end of the bus.

Fig. 3 illustrates in plan view, broken out, the floor frame.

Fig. 4 is a rear end view.

Fig. 5 is a vertical transverse section through the bus body, say on the line V—V Fig. 2 with seat cushions omitted.

Fig. 6 is a fragmentary horizontal section looking down at a toilet room.

Fig. 7 is a fragmentary plan view illustrating some details of the roof frame.

Fig. 8 is an end view of the roof frame detail as shown in Fig. 7.

Except for details mentioned the frame at each side of the bus are substantially identical, a description of one side will suffice for both.

The side beams of the dropped floor frame extend from end to end of the bus and consist of the intermediate horizontal portion 10, upwardly inclined portion 10$^a$ terminating in horizontal portions 10$^b$ below which the rear supporting wheels 11 and the wheels 12 of the tractor turn. The tractor shown at 9 can be of ordinary construction adapted to be coupled to the bus in the usual way.

The roof frame includes light double side beams 13, 13, trussed vertically together with slanting truss pieces 14 and intermediate longitudinal beams 13$^a$ with arched cross connecting strips 13$^b$, and diagonal bracing pieces 13$^c$.

Connecting the side beams 13 of the roof frame and the floor frame is a series of upright beams 15, the connections of which are supplemented and reinforced with upper and lower gusset plates 16 and 17 respectively; and connecting the sides of the end portions of the roof frame with the corresponding end portions of the floor side beams are large metallic gusset plates 18 and 19. The rear and front ends of the bus frame are covered, except for small paneled space at the top with a large metallic plate 20 secured to the corner and intermediate uprights. Near the forward end of the bus frame an upright 15$^a$ and a head piece 15$^b$ are added to form with the next upright 15 a gusset plate 17 a strong door frame in which a door 22 is hung (see Fig. 2) to provide the entrance and exit to the bus. It will be observed that this entrance and exit coincide with the top of the floor and is but a short step from the ground.

On each side of the central aisle (see Fig. 5) except at the elevated ends the interior of the bus is constructed to provide passenger seats facing each other. The backs of these seats are formed by transverse metallic plates 23 riveted to the uprights 15 and to longitudinal arm plates 24 and seat plates proper 25. The arm plates 24 at their lower margins are secured to the intermediate longitudinal beams 10$^c$ of the floor frame. All the parts thus far described are of comparatively light metal preferably riveted together where joined. The frame is covered with any suitable material of light weight and windows provided as shown.

From the construction thus shown and described it will be observed that the drop floor is firmly hung from the roof and prevented from perceptibly sagging and that the bus is braced transversely not only at the roof and ends but at the floor by the plates of the seat and back so that the bus can withstand collision, or roll down an embankment without collapsing.

One of the great inconveniences of most busses as at present commonly used is that no provision is made for comfortably sleeping so that when passengers make long journeys in them involving travel from midnight on they suffer a loss of proper rest. In my construction the seats and backs are provided with movable cushions as shown at 26 and 27 (see Fig. 2) that can be placed between the seats somewhat after the manner provided in Pullman railroad cars. Provision for upper berths can be made by boards such as at 28 and removable division panels or parts 29 above the seats suitable removable mattresses and pillows being furnished.

A toilet room for women can be provided in the elevated portion above the wheels at the rear end of the bus as shown in Figs. 2 and 6, the approach to the same being an inclined portion 29ª of the central aisle; while a suitable toilet (not shown) can be provided for men at the front end of the bus opposite the door of the car. A store room can be provided in the forward end of the bus at 30 just forward of the entrance door.

To summarize the chief advantages it will be observed that the suspending of the floor from the trussed roof beams prevents sagging and permits the bus to be made of profitable length as respects passenger carrying capacity; the center of gravity and passenger carrying space of the structure is greatly lowered as compared with those in which the entire passenger floor is placed over or substantially over the carrying wheels thereby rendering the bus less likely to topple over if run into a ditch or onto a sharp slope from the road; and the roof plates, gusset plates and beams being steel and the steel plates forming the seats brace the structure against both longitudinal and transverse crushing effects as from collision or rolling over thereby protecting the lives and limbs of passengers from injury by external means.

The forms of the parts can be changed without departing from the gist of the invention claimed.

What I claim is:

1. A bus having supporting wheels at its ends, the frame of said bus including a trussed roof frame, a floor frame dropped from above to a level below the tops of and between the supporting wheels, and side gusset plates at the terminal portions only of the bus connecting the ends of the roof and floor frames at the sides thereof and extending across the angle between the floor above the supporting wheels and the dropped floor and upright beams between the gusset plates suspending the floor from the roof truss frame.

2. A bus having supporting wheels at its ends, the frame of said bus including a trussed roof frame, a floor frame dropped from above to a level below the tops of and between the supporting wheels, and side gusset plates at the terminal portions only of the bus connecting the ends of the roof and floor frames at the sides thereof and extending across the angle between the floor above the supporting wheels and the dropped floor and an end plate connecting the corner upright beams of the end and upright beams between the gusset plates suspending the floor frame from the roof truss frame.

CHARLES H. FRAZER.